United States Patent [19]

Brüderle et al.

[11] 4,174,819
[45] Nov. 20, 1979

[54] CONTROLLER FOR THE ATTITUDE STABILIZATION OF A SATELLITE

[75] Inventors: Ernst Brüderle, Ottobrunn; Eveline Gottzein, Oberpframmern; Helmut Bittner, Munich, all of Fed. Rep. of Germany

[73] Assignee: Messerschmitt-Bölkow-Blohm Gesellschaft mit beschränkter Haftung, Munich, Fed. Rep. of Germany

[21] Appl. No.: 923,531

[22] Filed: Jul. 11, 1978

[30] Foreign Application Priority Data

Jul. 16, 1977 [DE] Fed. Rep. of Germany ...... 2732201

[51] Int. Cl.² .............................................. B64G 1/20
[52] U.S. Cl. ............................... 244/169; 244/170; 244/171; 244/176
[58] Field of Search ............... 244/169, 175, 177, 179, 244/170, 176, 171, 3.22; 318/584, 585, 592, 594, 489; 114/122, 126; 364/434

[56] References Cited

U.S. PATENT DOCUMENTS

| 3,547,381 | 12/1970 | Shaw | 244/169 |
|---|---|---|---|
| 3,643,897 | 2/1972 | Johnson | 244/169 |
| 3,984,071 | 10/1976 | Fleming | 244/169 |

*Primary Examiner*—Reinhard J. Eisenzopf
*Attorney, Agent, or Firm*—Toren, McGeady and Stanger

[57] ABSTRACT

A controller for the attitude stabilization of a satellite. The controller modifies the action of a first control circuit by responding to the signals of attitude $\phi$ and angular velocity of attitude $\dot\phi$ developed by the first control circuit. A second control circuit includes a comparator, two Schmitt trigger circuits, two AND elements and two OR elements. Signals from the AND elements and uncorrected thrust nozzle control signals from the first control circuit are supplied to the OR elements. The output of the OR elements control the thrust nozzles of the satellite.

5 Claims, 3 Drawing Figures

CONTROLLER FOR THE ATTITUDE STABILIZATION OF A SATELLITE

FIELD OF THE INVENTION

The invention relates to a controller for the attitude stabilization of a satellite.

BACKGROUND OF THE PRESENT INVENTION

Controllers of the aforementioned type are required in satellites in order to reduce the angle of deviation of the attitude of the satellite from a reference direction to a permissible degree which may result from a number of individual criteria. This deviation may significantly lessen or even completely eliminate the usefulness of the satellite in its path.

U.S. Pat. No. 3,984,071 describes an attitude stabilization apparatus for a nutating satellite, wherein a sensor generates an error signal and the error signal is supplied to a filter. After the filter, a summing point is arranged, from which the signal is supplied to two Schmitt triggers. The first Schmitt trigger is activated when the signal from the sensor indicates a positive error of a certain magnitude; the second Schmitt trigger is activated when a negative error is present. An output of each Schmitt trigger leads to a multivibrator which delivers a pulse as soon as it is triggered. The other output of each Schmitt trigger leads to an OR element which is also connected to the output of the multivibrator. The output of the OR element is directed to another OR element, the output of the latter activating a first nozzle for generating a counter-torque against the positive angle error. The essence of the invention lies in the fact that, after the first-mentioned OR element, a counter is arranged which is set to zero by each pulse delivered by the OR element and starts a count which is compared to the normal duration of a nutation. If, since the last time the counter has been set to zero, a certain portion of a nutation period has elapsed, preferably 5/8 of such a period, without a new pulse having been delivered by the first OR element, then this counter activates (through the already mentioned second OR element) the thrust nozzle for another ignition.

In this manner, the satellite is to be prevented from swinging back and forth between the boundaries of a predetermined band caused by the attitude control which would result in a high fuel consumption and, therefore, would reduce the service life of the satellite in its path, or the possible payload.

However, it is a disadvantage in this apparatus that not every variation of the parameters, for example, the moment of inertia or the rate of rotation of the reaction wheel which must lead to a change of the nutation period, is recognized.

It is an object of the present invention to specify an apparatus for an active control which provides attitude stabilization independently of the parameter variations.

SUMMARY OF THE PRESENT INVENTION

In accordance with the present invention, a controller for attitude stabilization of a satellite includes a first attitude control circuit by which the satellite can be returned to an attitude within predeterminable band boundaries. Also included is a second control circuit to which, from the first attitude control circuit, values for the attitude angle and the angular velocity of the attitude can be fed and which has a comparator from which, when $\phi$, $\dot{\phi}$ are either both positive or negative, an output signal is derived, which output signal is supplied to two AND elements. An additional signal is supplied to each of these AND elements from Schmitt triggers assigned to the positive direction of the attitude error and the negative direction of the attitude error. The outputs of the AND elements are connected to OR elements which are also supplied by the first control circuit. Thrust nozzles can be activated by the outputs of the OR elements.

It is particularly advantageous that, due to the active control, the attenuation of the satellite can be effected in an especially fuel saving manner without requiring a significant number of cumbersome apparatus. The building-up behavior of the controller is superior to that of other known apparatus. There is the additional result that the inventive apparatus is also suitable for the attitude control of satellites which are not stable with respect to rotation. Accordingly, the apparatus of the present invention can be universally used in the field of astronautics.

For a better understanding of the present invention, reference is made to the following description and the accompanying drawings while the scope of the invention will be pointed out in the appended claims.

DESCRIPTION OF THE PREFERRED EMBODIMENTS

Figure 1:
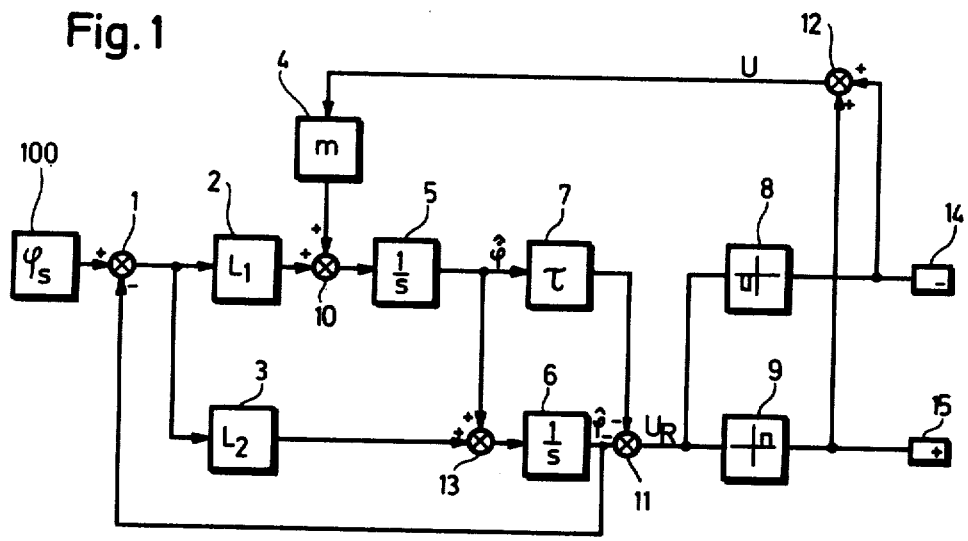
FIG. 1 illustrates a controller with observer, Schmitt trigger, but without nutation attenuation.

Referring initially to FIG. 1, a controller for the attitude stabilization of a satellite is shown which includes a sensor 100, summation points 1, 10, 13, 11, 12, the observer constants 2, 3, integration elements 5, 6, an amplifier 4, a controller constant 7, Schmitt triggers 8, 9 and thrust nozzles 14, 15.

The observer equations for this controller are:

$$\ddot{\hat{\phi}} = m \cdot u + L_1(\phi_s - \hat{\phi})$$

$$\dot{\hat{\phi}} = \hat{\dot{\phi}} + L_2(\phi_s - \hat{\phi})$$

Controller signal:

$$u_R = -\hat{\phi} - \tau\dot{\hat{\phi}}$$

$L_1$, $L_2$: Observer constants
$\tau$: Controller constant

In this embodiment, velocity $\dot{\phi}$ and attitude $\phi$ are estimated. These estimated values are corrected by means of the measurement $\phi_s$ and the nozzle emissions u. Of course, the velocity values can also be obtained not by estimating but, for example, by direct measurement or other suitable measures.

Depending on the direction of the signal generated by sensor 100, either the negative thrust nozzle 14 or the positive thrust nozzle 15 is switched in a manner known per se by means of the Schmitt triggers 8, 9. As the block diagram shows, the nozzle emission signal u is supplied to the summation element 10 through the amplifier 4 for a correction of the measurement $\phi_s$, the fixed quotient $m = \text{torque}/I_x$ being formed in the amplifier 4, wherein $I_x$ is the moment of inertia of the satellite about the x-axis.

A controller operating according to the principle of control shown in FIG. 1 would allow the satellite to swing to and fro within the band boundaries which are determined by its specific parameters. Accordingly, the attenuation within the predetermined band, which is such a decisive factor in astronautics, cannot be effected by a normal control circuit of the indicated type.

Figure 2:
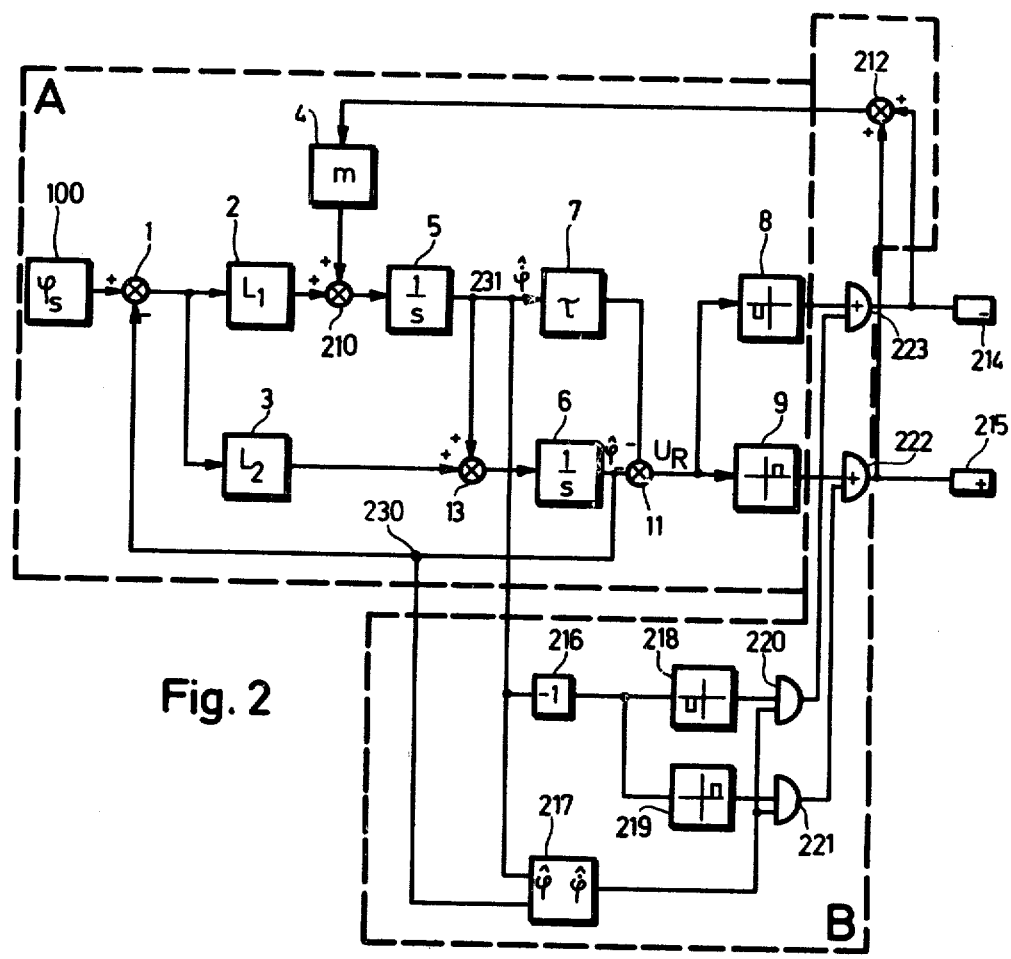
FIG. 2 illustrates a controller with observer and velocity restriction for an active nutation attenuation.

FIG. 2 shows how, starting from the basic concept illustrated in FIG. 1, it is possible to design a controller which is particularly well suited for the attitude control of satellites. For a better orientation, corresponding components are denoted by the same reference numerals as in FIG. 1. Accordingly, for the explanation of the conventional circuit denoted by A, the description of FIG. 1 can be referred to.

The controller (part B) takes off the values $\phi$ and $\dot{\phi}$ at the junctions 230, 231, the values $\phi$ and $\dot{\phi}$ having been obtained by estimating or in another manner (measurement, etc.). The estimated attitude value $\phi$ and the estimated velocity value $\dot{\phi}$ are supplied to a comparator means 217 which delivers an output signal if $\dot{\phi}$ and $\phi$ are either both negative or positive. Two voltage comparators LS2111 followed by an exclusive OR-gate MM54C86 of National Semiconductors and a standard inverter may be employed as circuit element 217. The estimated value for $\dot{\phi}$ is supplied to two Schmitt triggers 218, 219 through a sign changer 216. Analogously to the Schmitt triggers 8, 9, the two Schmitt triggers 218, 219 deliver at their outputs signals which correspond to the sign of the velocity. The output of the element 217 is fed to the AND elements 220, 221. In this embodiment, the output signal of the Schmitt trigger 218 assigned to the negative thrust nozzle 214 is supplied to AND elements 220 and, accordingly, the output signal of the Schmitt trigger 219 assigned to the positive thrust nozzle 215 is supplied to AND element 221.

The outputs of the two AND elements 220, 221 are supplied to the OR elements 223, 222 which, at their outputs, control the thrust nozzles 214 and 215.

As the figure shows, the velocity signal $\dot{\phi}$ is limited in parallel to the first control circuit A. The limitation of this velocity means that nutation will also be limited, since the reduction of the velocity within the predetermined band corresponds to an active attenuation control.

Figure 3:
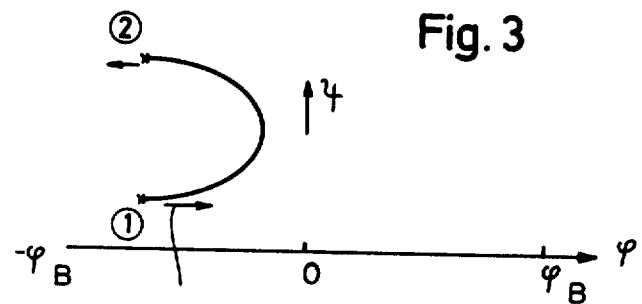
FIG. 3 illustrates an example for the intervention of the controller shown in FIG. 2.

FIG. 3 shows an example for the intervention of the attitude controller. The attitude angle $\phi$ is shown on the abscissa of the diagram in the positive and in the negative direction, while the ordinate shows the angle of yaw $\psi$ of the satellite. The boundaries of the band for a specific satellite are determined by $-\phi_B$ and $+\phi_B$. The curve from 1 to 2 shows the direction of the attitude change. If the satellite attitude is at the left border of the band in point 1, the attitude control circuit B does not intervene even when the velocity already exceeds the permissible value. The velocity is advantageously reduced at point 2 where $\phi$ and $\dot{\phi}$ have the same sign since only there the arrival at the band boundary is imminent and, therefore, prevented.

If the deviation of $\phi$ is small compared to the band boundary, an observation of just the sign of $\phi$ may lead to unnecessary thrust activations. Therefore, it is advantageous to make additional adjustments for the magnitude of $\phi$ and $\dot{\phi}$. Preferably, a signal may be obtained at comparator element 217 when the following condition is met:

1. $|\dot{\phi}| - \omega|\phi| \geq \epsilon$, $\phi >$ upon the occurrence of which the negative thrust nozzle 214 is activated
2. $|\dot{\phi}| - \omega|\phi| \geq \epsilon$, $\dot{\phi} < 0$ upon the occurrence of which the positive thrust nozzle 215 is activated wherein $\omega$ and $\epsilon$ are constant parameter values.

In this case, the element 217 assumes the function of the elements 216, 218, 219, 220, 221.

The circuit B can also be designed in such a manner that the element 217 additionally assumes the function of the Schmitt triggers by means of a threshold circuit known to one skilled in the art. In this case, the elements 216, 218, 219, 220, 221 are also not required and the element 217 has two outputs, one of which is assigned to the negative thrust nozzle and the other to the positive thrust nozzle.

While the foregoing description and drawings represent the preferred embodiments of the present invention, it will be obvious to those skilled in the art that various changes and modifications may be made therein without departing from the true spirit and scope of the present invention.

What is claimed is:

1. In a controller for the attitude stabilization of a satellite, having a first attitude control circuit by means of which said satellite can be returned to a position within predetermined band boundaries, $-\phi_B$, $+\phi_B$, and having output signals for controlling positive and negative thrust nozzles, the improvement comprising: a second control circuit, said second control circuit being supplied from said first attitude control circuit with values for the attitude angle $\phi$ and the angular velocity of the attitude $\dot{\phi}$, said second control circuit including a comparator means for providing an output signal when $\phi$, $\dot{\phi}$ have the same sign, two AND elements responsive to the output signal of the comparator, two Schmitt triggers responsive to the positive direction and the negative direction of the attitude error respectively, each for supplying an output signal to one of said AND elements, OR elements responsive to the outputs of said AND elements and also responsive to said output signals from the first control circuit, the outputs of said OR elements being used for activating positive and negative thrust nozzles.

2. A controller according to claim 1, wherein said comparator means provides an output signal when the values $\phi$, $\dot{\phi}$ have reached a predetermined magnitude and sign.

3. A controller according to claims 1 or 2, wherein said comparator means provides an output signal when the values $\phi$ and $\dot{\phi}$ meet the following criteria:

1. $|\dot{\phi}| - \omega|\phi| \geq \epsilon$, $\dot{\phi} > 0$ upon the occurrence of which the negative thrust nozzle is activated;
2. $|\dot{\phi}| - \omega|\phi| \geq \epsilon$, $\dot{\phi} < 0$ upon the occurrence of which the positive thrust nozzle is activated wherein $\omega$, $\epsilon$ = constant parameter values.

4. A controller according to claims 1 or 2, wherein said comparator means has a trigger threshold depending on the values $\phi$ and $\dot{\phi}$, and providing an output signal for controlling said positive and said negative thrust nozzles when the threshold is exceeded.

5. In a controller for the attitude stabilization of a satellite having first attitude control means for maintaining the attitude of the satellite within predetermined band boundaries, $-\phi_B$, $+\phi_B$, said control means providing signals representative of the attitude angle of the satellite $\phi$ and the angular velocity of attitude $\dot{\phi}$ and also providing uncorrected output signals for controlling positive and negative thrust nozzles, the improvement comprising:

second attitude control means for controlling the rate of correction of the attitude of the satellite including:
  comparator means responsive to the $\phi$ and $\dot{\phi}$ signals for providing an output signal when the $\phi$ and $\dot{\phi}$ signals have the same sign;
  first and second trigger means responsive to the $\dot{\phi}$ signal, each for providing an output when its input exceeds a prescribed threshold, said first trigger means responsive to a negative input signal and said second trigger means responsive to a positive input signal;
  first and second AND elements responsive to output signals from said first and second trigger means respectively and also responsive to the output signal from the comparator means; and
  first and second OR elements responsive to the outputs of said AND elements respectively and responsive to the uncorrected output signals of the first attitude control means for providing corrected output signals to control the positive and negative thrust nozzles.

* * * * *